(12) United States Patent
Yang (10) Patent No.: US 8,516,700 B2
(45) Date of Patent: Aug. 27, 2013

(54) METHOD FOR MANUFACTURING FLAT PLATE HEAT PIPE

(75) Inventor: Hsiu-Wei Yang, Sinjhuang (TW)

(73) Assignee: Beijing AVC Technology Research Center Co., Ltd., Beijing (CN)

( * ) Notice: Subject to any disclaimer, the term of this patent is extended or adjusted under 35 U.S.C. 154(b) by 75 days.

(21) Appl. No.: 12/824,252

(22) Filed: Jun. 28, 2010

(65) Prior Publication Data
US 2011/0314674 A1    Dec. 29, 2011

(30) Foreign Application Priority Data
Apr. 26, 2010    (TW) .............................. 099113102 A (51) Int. Cl.
*F28D 15/00*    (2006.01)

(52) U.S. Cl.
USPC ............ 29/890.032; 29/890.043; 29/890.054; 29/525.14; 165/104.26

(58) Field of Classification Search
USPC ....... 29/890.032, 890.038, 890.043, 890.045, 29/890.046, 890.049, 421.1, 525.14, 530, 29/890.054; 165/104.26
See application file for complete search history.

(56) References Cited

U.S. PATENT DOCUMENTS

| | | | |
|---|---|---|---|
| 7,143,511 B2 * | 12/2006 | Connors et al. | 29/890.032 |
| 7,159,647 B2 * | 1/2007 | Hsu | 165/104.26 |
| 7,954,237 B2 * | 6/2011 | Cheng | 29/890.032 |

* cited by examiner

*Primary Examiner* — Jermie Cozart
*Assistant Examiner* — Steven A Maynard
(74) *Attorney, Agent, or Firm* — C. G. Mersereau; Nikolai & Mersereau, P.A.

(57) ABSTRACT

The present invention relates to a method for manufacturing a flat plate heat pipe, which includes steps of: forming a wick structure layer and at least one wick structure post on the inner surface of a chamber of a pipe, pressing the pipe to become a flattened pipe with the wick structure post being connected therein, connecting a conduit to the chamber, sealing both sides of the flattened pipe, evacuating air inside the chamber through the conduit, filling a working fluid into the chamber, and sealing the conduit. According to this method, a flat plate heat pipe can be made in a simplified manner with increased yield and reduced cost.

6 Claims, 10 Drawing Sheets

```
providing a pipe and a central rod, the pipe having
a continuously surrounding wall unit, the wall unit defining
a chamber therein, the chamber being formed with a first
through-hole and a second through-hole on both ends of the
pipe, the central rod being inserted into the pipe in such
a manner that an outer surface of the central rod faces
an inner surface of the chamber to form a filling space
there between, the outer surface of the central rod being     ── sp1
formed with a plurality of grooves in communication with
the filling space, filling powders in the filling space
and the grooves, sintering the pipe filled with the powders
and then removing the central rod from the pipe, thereby
forming a wick structure layer and at least one wick
structural post on the inner surface of the chamber, the
wick structure post having a free end protruding from the
wick structure layer;

pressing the pipe to become a flattened pipe, the flattened
pipe having an upper plate and a lower plate, the free end
of the wick structure post being tightly connected to one    ── sp2
of the upper plate and the lower plate and configured to
support between the upper plate and the lower plate;

providing a conduit having a first end exposed to the
outside of the pipe and a second end in communication with,  ── sp3
and partially received within the chamber;

sealing the first through-hole and the second through-hole
of the flattened pipe to form a first sealing side and       ── sp4
a second sealing side to thereby seal the chamber;

connecting the conduit to the flattened pipe;                ── sp5 evacuating air in the chamber with the conduit, filling
a working fluid in the chamber through the conduit, and      ── sp6
the first end of the conduit.
```

Fig. 1 providing a pipe and a central rod, the pipe having a continuously surrounding wall unit, the wall unit defining a chamber therein, the chamber being formed with a first through-hole and a second through-hole on both ends of the pipe, the central rod being inserted into the pipe in such a manner that an outer surface of the central rod faces an inner surface of the chamber to form a filling space there between, the outer surface of the central rod being formed with a plurality of grooves in communication with the filling space, filling powders in the filling space and the grooves, sintering the pipe filled with the powders and then removing the central rod from the pipe, thereby forming a wick structure layer and at least one wick structural post on the inner surface of the chamber, the wick structure post having a free end protruding from the wick structure layer; — sp1 pressing the pipe to become a flattened pipe, the flattened pipe having an upper plate and a lower plate, the free end of the wick structure post being tightly connected to one of the upper plate and the lower plate and configured to support between the upper plate and the lower plate; — sp2 providing a conduit having a first end exposed to the outside of the pipe and a second end in communication with, and partially received within the chamber; — sp3 sealing the first through-hole and the second through-hole of the flattened pipe to form a first sealing side and a second sealing side to thereby seal the chamber; — sp4 connecting the conduit to the flattened pipe; — sp5 evacuating air in the chamber with the conduit, filling a working fluid in the chamber through the conduit, and the first end of the conduit. — sp6

METHOD FOR MANUFACTURING FLAT PLATE HEAT PIPE

This application claims the priority benefit of Taiwan patent application number 099113102 filed on Apr. 26, 2010.

BACKGROUND OF THE INVENTION

1. Field of the Invention

The present invention relates to a method for manufacturing a flat plate heat pipe, and in particular to a method for manufacturing a flat plate heat pipe in which a wick structure and a wick structure post are integrally formed.

2. Description of Prior Art

With the advancement of science and technology, the amount of heat generated by an electronic component during its operation is increased greatly. Thus, it is an important issue for the electronic industry to solve the problems relating to the cooling or heat dissipation of the electronic components. Further, in view of the requirements for high efficiency, integration and versatility of the electronic components, the manufacturers in the electronic industry aims to increase the heat transfer efficiency.

A heat sink is often used to dissipate the heat of an element or system to the outside. In case of a smaller thermal resistance, the heat-dissipating efficiency of the heat sink becomes larger. In general, the thermal resistance of the heat sink is constituted of a spreading resistance within the heat sink and a convection resistance between the surface of the heat sink and ambient atmosphere. In practical applications, materials of high thermal conductivity such as copper or aluminum are used to manufacture the heat sink to thereby reduce the spreading resistance. However, the convection resistance is still so large that it undesirably restricts the performance of the heat sink. As a result, the heat-dissipating efficiency of the heat sink cannot conform to requirements for the heat dissipation of new-generation electronic elements.

As mentioned in the above, in order to enhance the heat-dissipating efficiency, various kinds of heat pipes and vapor chambers with high thermal conductivity are developed to be assembled with a heat sink.

Figure 1:
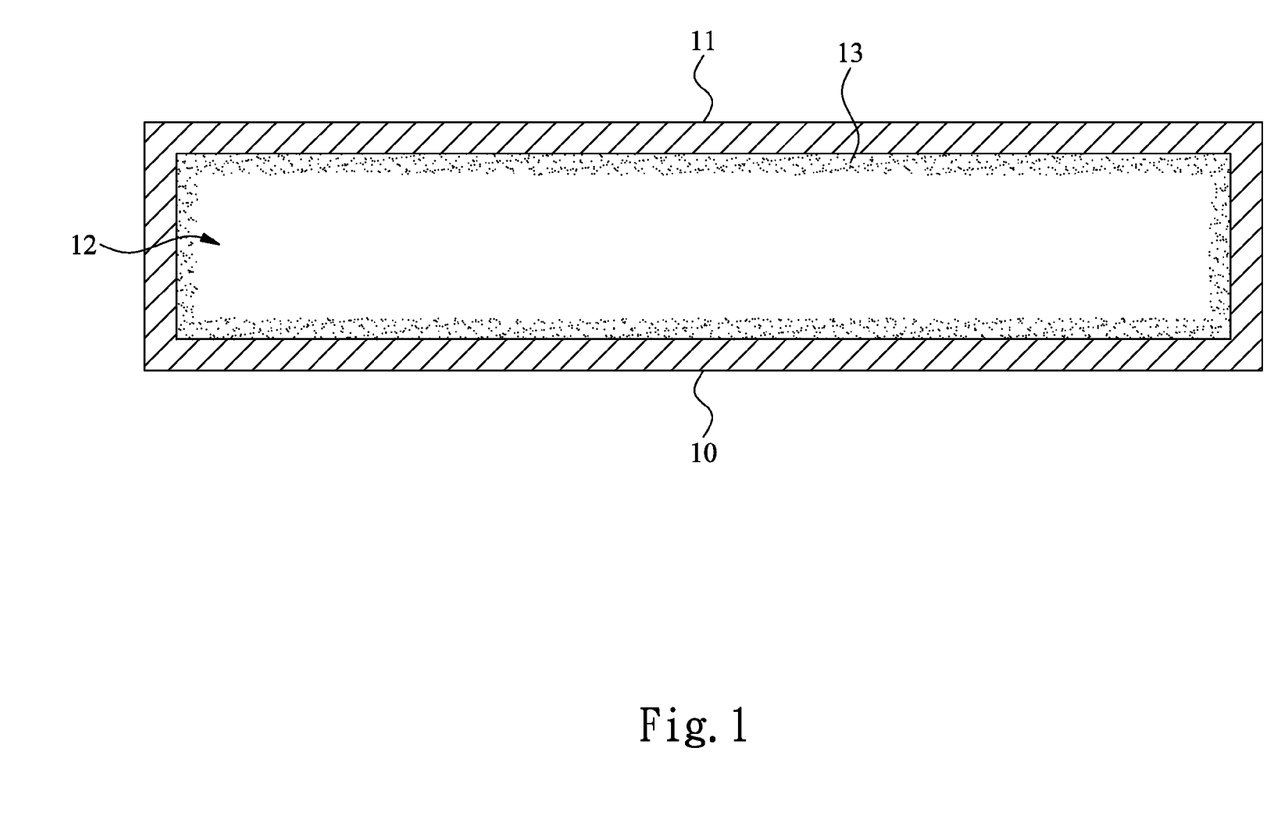
FIG. 1 is a schematic view of prior art.

Please refer to FIG. 1. The conventional flat plate heat pipe is constituted of a first copper plate 10 and a second copper plate 11. The first copper plate 10 is connected to the second copper plate 11 to define a chamber 12 there between. The chamber 12 is filled with a working fluid such as water or other suitable liquid. Two opposing surfaces of the first copper plate 10 and the second copper plate 11 are formed with a wick structure 13 respectively in such a manner that the inner surfaces of the chamber 12 are coated with the wick structure 13. Conventionally, the primary functions of the wick structure 13 are as follows: the amount of heat passing through the wall of the vapor chamber is reduced; the total area for evaporating the working fluid is increased; and the growth of vapor film is prevented due to the contact of the wick structure and the wall of the chamber. Due to gravity and capillary force of the working fluid, the working fluid is distributed in the wick structure 13 inside the chamber 12 (i.e. the wick structure 13 provided on the first copper plate 10 and the second copper plate 11).

The outer surface of the first copper plate 10 opposite to the chamber 12 is brought into contact with a heat-generating element (such as a central processor). At this time, the first copper plate 10 is referred to as an evaporating end, whereby the heat generated by the heat-generating element is conducted to the second copper plate 11 (referred to as a condensing end) for heat dissipation. Thus, the heat generated by the heat-generating element is absorbed by the first copper plate 10, thereby heating and evaporating the working fluid on the wick structure 13.

Thereafter, the vapor quickly flows toward a colder place (i.e. the second copper plate 11) where the vapor releases its latent heat and condenses into liquid. By means of the capillary force of the wick structure 13 on the second copper plate 11, the condensed droplets of the working fluid flow back to the first copper plate 10. With this circulation of the working fluid, the heat of the heat-generating element can be dissipated.

However, during the phase change of the working fluid between vapor and liquid, the working fluid flowing in the wick structure 13 may cause some problems as follows. (1) Although the increase of the heat flux also raises the phase-changing speed of the working fluid, the amount of working fluid flowing back to the evaporating end is insufficient because the tiny pores and low permeability of the wick structure may hinder the working fluid from flowing back to the evaporating end. As a result, the evaporating end of the heat pipe may be dried out to deteriorate its heat-dissipating efficiency. (2) When the heat flux continuously increases to such an extent that the vapor pressure is larger than the liquid pressure, vapors or bubbles may be generated in the wick structure to hinder the working fluid from flowing back to the evaporating end. Then, a film of vapor having a large thermal resistance is generated between the evaporating end and the wick structure, so that the heat absorbed by the evaporating end cannot be taken away by the working fluid smoothly. As a result, the heat is continuously accumulated in the evaporating end, so that the evaporating end of the heap pipe is dried out to deteriorate its heat-dissipating efficiency.

According to the above, the conventional flat plate heat pipe has drawbacks as follows;

(1) Since the casing of the heat pipe is constituted of an upper plate and a lower plate, four sides of the upper plate and the lower plate are soldered to form a sealed casing. Thus, the actual working space available for accommodating the working fluid will be inevitably reduced due to the soldered sides of the upper plate and the lower plate.

(2) Since four sides of the upper plate and the lower plate have to be soldered together to form a sealed casing, the process is no doubt time-consuming with a higher production cost.

Therefore, it is an important issue for the present inventor and the manufacturers in this filed to solve the above-mentioned problems in prior art.

SUMMARY OF THE INVENTION

In order to solve the above problems, an objective of the present invention is to provide a method for manufacturing a flat plate heat pipe involving fewer steps. Thus, the flat plate heat pipe can be made in a simplified manner with increased yield and reduced cost.

Another objective of the present invention is to provide a method for manufacturing a flat plate heat pipe, in which a pipe is formed therein with a wick structure layer and a wick structure post. Then, the pipe is pressed to make a flattened pipe with the wick structure post supporting in the flattened pipe to thereby prevent the flattened pipe from suffering deformation and maintain its structural strength.

In order to achieve the above objectives, the present invention further provides a method for manufacturing a flat plate heat pipe, including steps of:

providing a pipe and a central rod, the pipe having a continuously surrounding wall unit, the wall unit defining a chamber therein, the chamber being formed with a first through-hole and a second through-hole on both ends of the pipe, the central rod being inserted into the pipe in such a manner that an outer surface of the central rod faces an inner surface of the chamber to form a filling space there between, the outer surface of the central rod being formed with a plurality of grooves in communication with the filling space, filling powders in the filling space and the grooves, sintering the pipe filled with the powders and then removing the central rod from the pipe, thereby forming a wick structure layer and a wick structural post on the inner surface of the chamber, the wick structure post having a free end protruding from the wick structure layer;

pressing the pipe to become a flattened pipe, the flattened pipe having an upper plate and a lower plate, the free end of the wick structure post being tightly connected to one of the upper plate and the lower plate and configured to support between the upper plate and the lower plate;

providing a conduit having a first end exposed to the outside of the pipe and a second end in communication with the chamber;

sealing the first through-hole and the second through-hole of the flattened pipe to form a first sealing side and a second sealing side to thereby seal the chamber;

connecting the conduit to the flattened pipe;

evacuating air in the chamber with the conduit, filling a working fluid in the chamber through the conduit, and sealing the first end of the conduit.

In order to further understand the characteristics and technical contents of the present invention, the detailed description relating thereto will be explained with reference to accompanying drawings.

BRIEF DESCRIPTION OF THE DRAWINGS

FIG. 2 is a flow chart of a manufacturing method of the present invention;

DETAILED DESCRIPTION OF THE INVENTION

The present invention provides a method for manufacturing a flat plate heat pipe. The drawings show a preferred embodiment of the present invention. Please refer to FIG. 2, which shows that the method of the present invention includes steps as follows.

Figure 3:
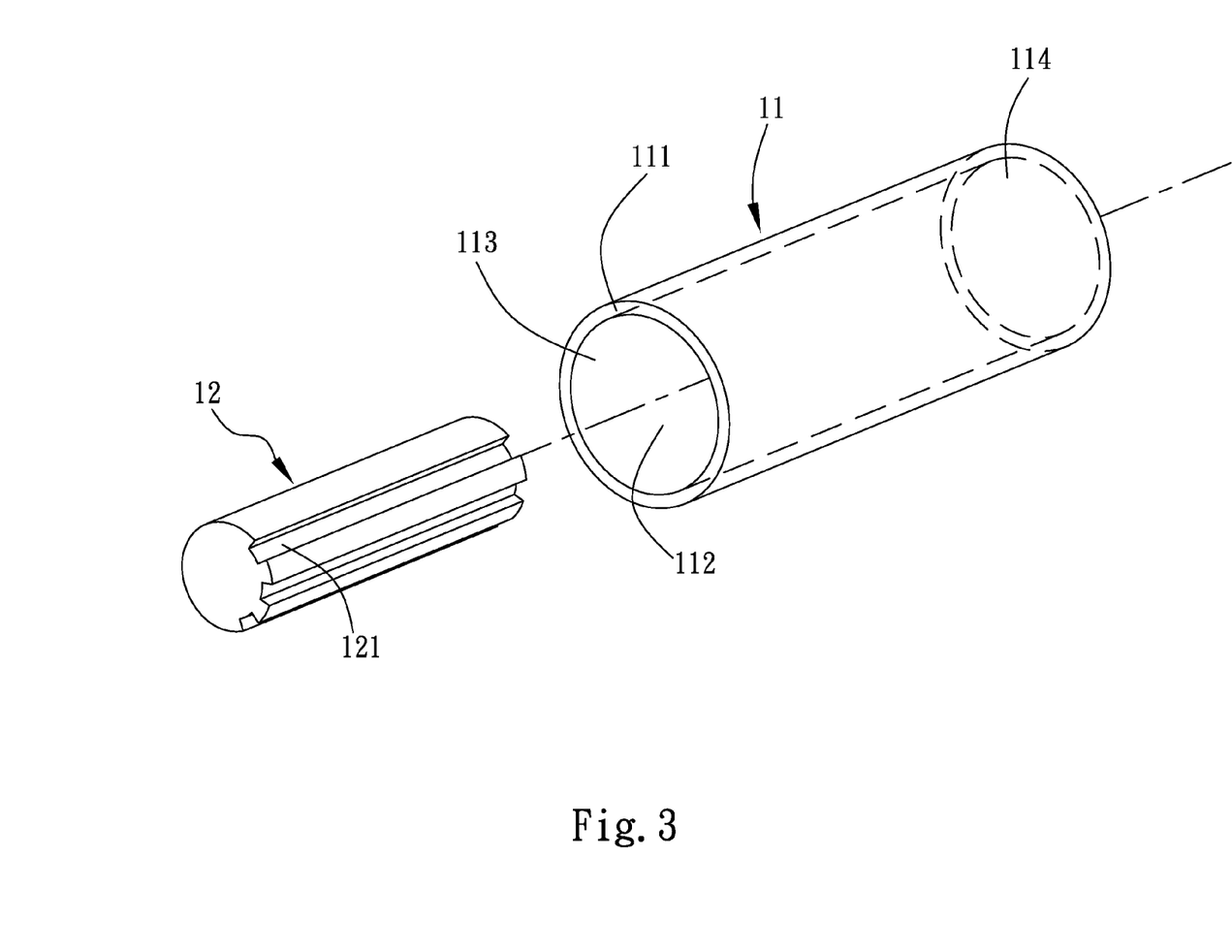
FIG. 3 is an exploded perspective view showing a pipe and a central rod of the present invention.
Figure 4:
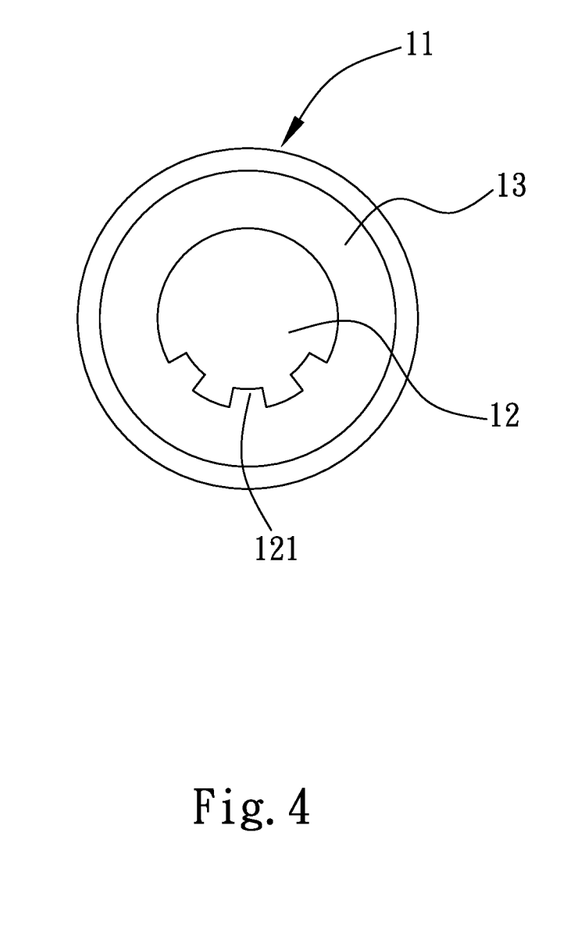
FIG. 4 is an assembled perspective view showing the pipe and the central rod of the present invention.
Figure 5:
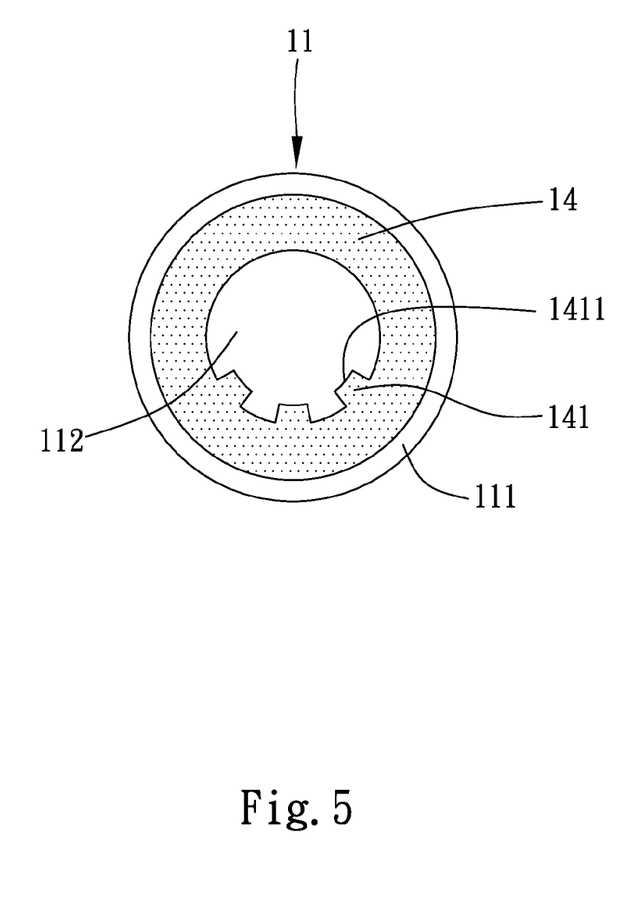
FIG. 5 is a schematic view showing a wick structure layer and a wick structure post being formed on the inner surface of the chamber.

In the first step (sp1), a pipe 11 and a central rod 12 are provided as shown in FIGS. 3 and 4. The pipe 11 has a continuously surrounding wall unit 111 defining a chamber 112 therein. The chamber 112 is formed with a first through-hole 113 and a second through-hole 114 on both ends of the pipe 11. The central rod 12 is inserted into the pipe 11 in such a manner that the outer surface of the central rod 12 faces the inner surface of the chamber 112, and a filling space 13 is formed between the inner surface of the chamber 112 and the outer surface of the central rod 12. The outer surface of the central rod 12 is formed with a plurality of grooves 121 in communication with the filling space 13. Then, powders are filled in the filling space 13 and the grooves 121. The pipe 11 filled with the powders is subjected to a sintering process. Thereafter, the central rod 12 is removed from the pipe 11. As shown in FIG. 5, a wick structure layer 14 and at least one wick structure post 141 are formed on the inner surface of the chamber 112. The wick structure post 141 has a free end 1411 protruding from the wick structure layer 14.

Figure 6:
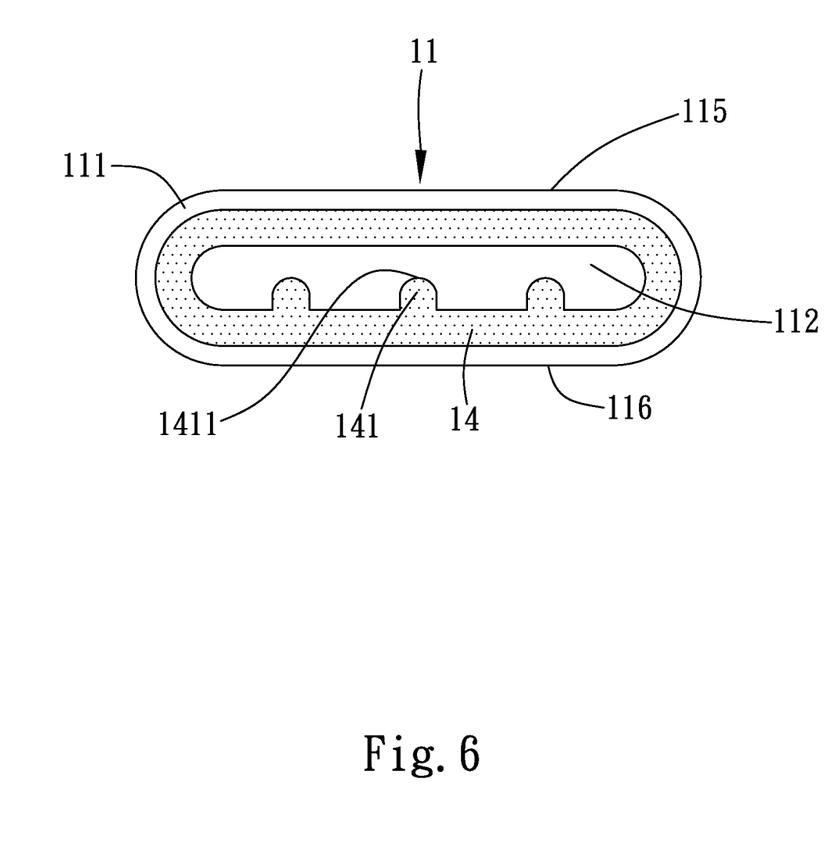
FIG. 6 is a schematic view showing the pipe being pressed flattened according to the present invention.
Figure 7:
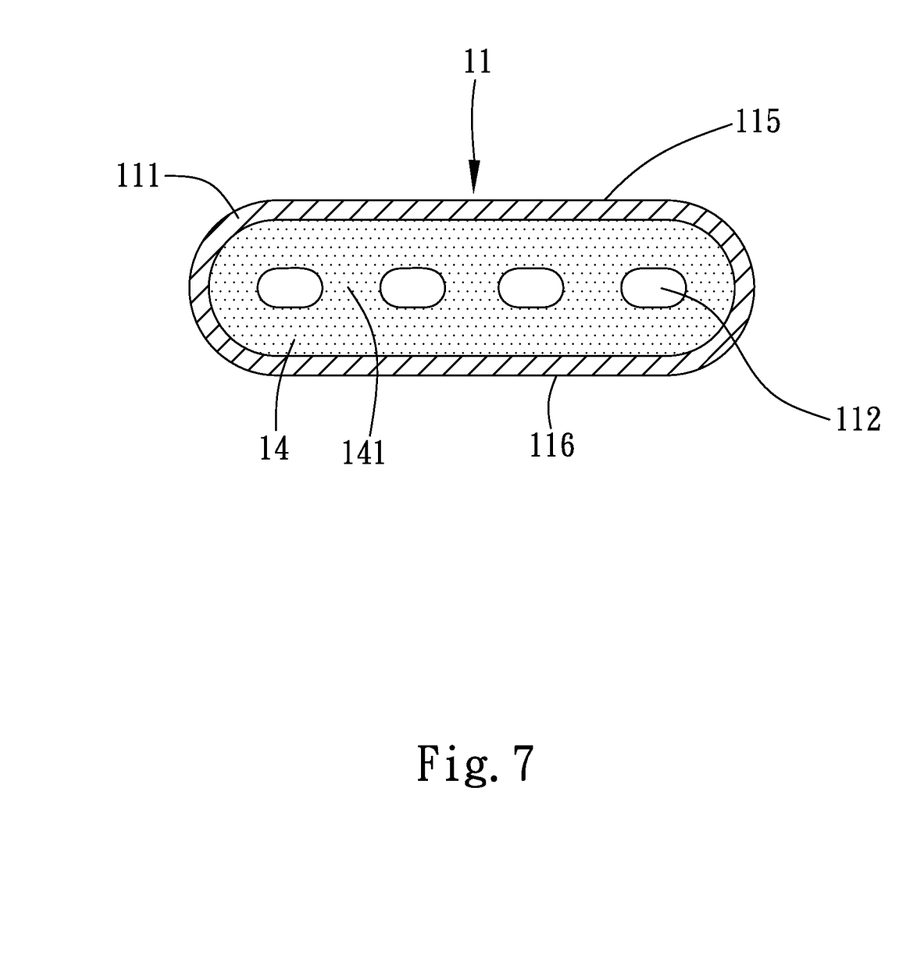
FIG. 7 is a schematic view showing the wick structure post being connected to the upper plate according to the present invention.

In the second step (sp2), the pipe 11 is pressed to become a flattened pipe as shown in FIGS. 6 and 7. The flattened pipe 11 has an upper plate 115 and a lower plate 116. The free end 1411 of the wick structure post 141 is tightly connected to any of the upper plate 115 and the lower plate 116. In the present embodiment, the free end 1411 is connected to the upper plate 115 to support between the upper plate 115 and the lower plate 116.

Figure 8:
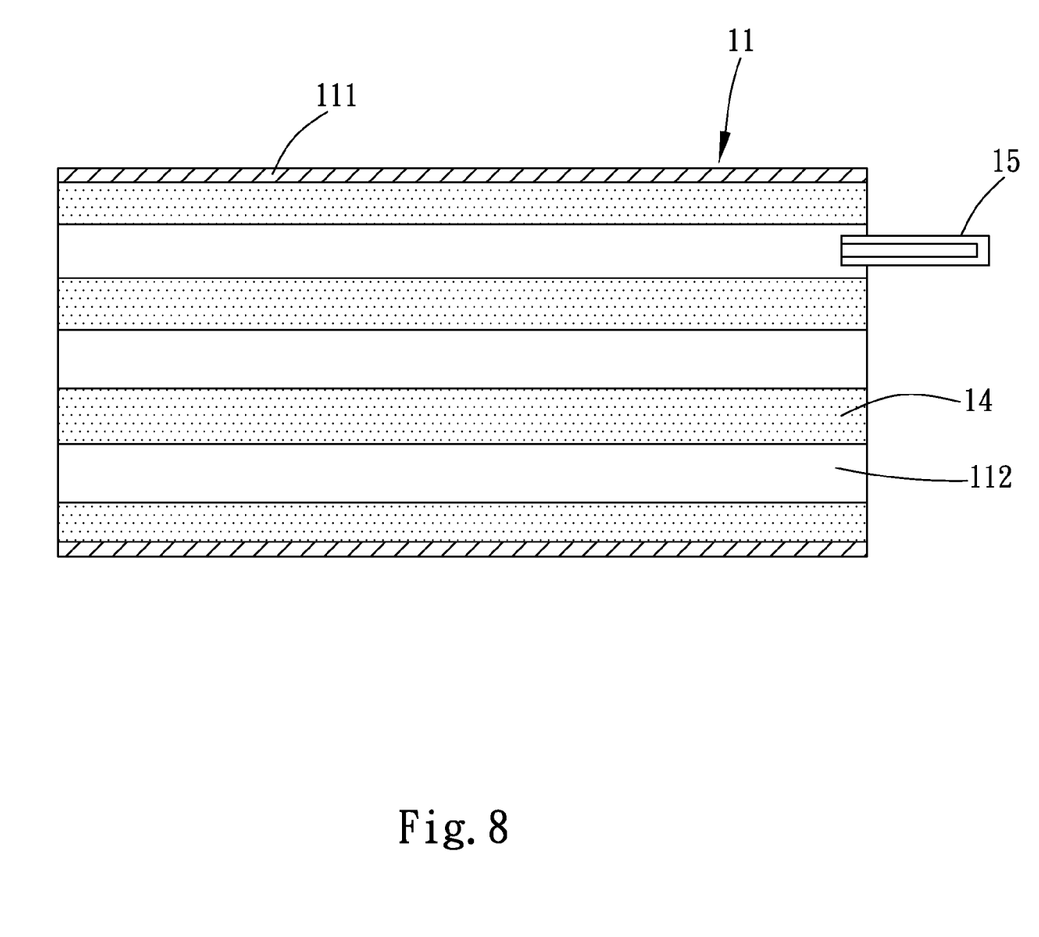
FIG. 8 is a schematic view showing a conduit being inserted into a flattened pipe according to the present invention.
Figure 9:
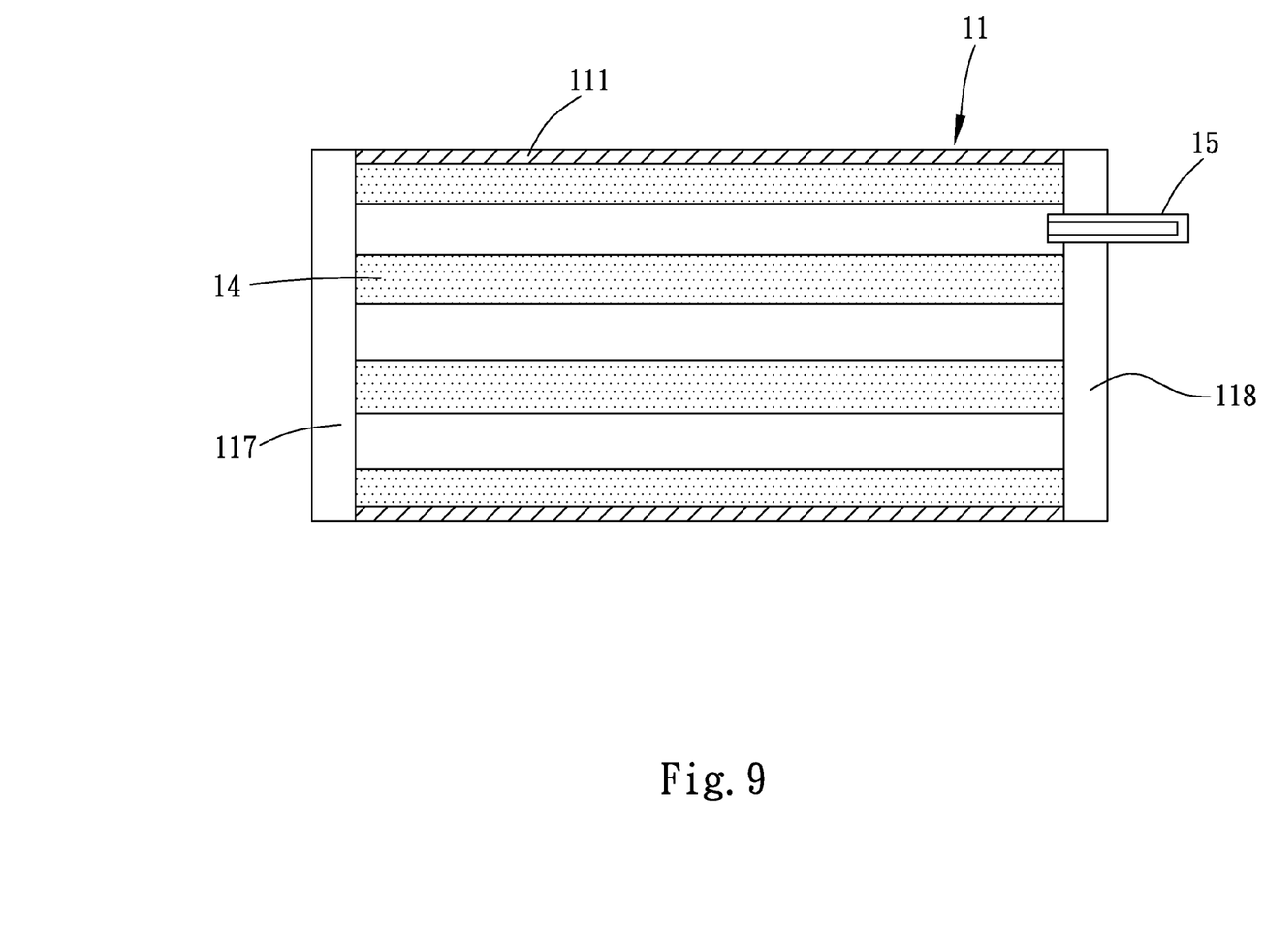
FIG. 9 is a schematic view showing both sides of the flattened pipe being sealed according to the present invention.
Figure 10:
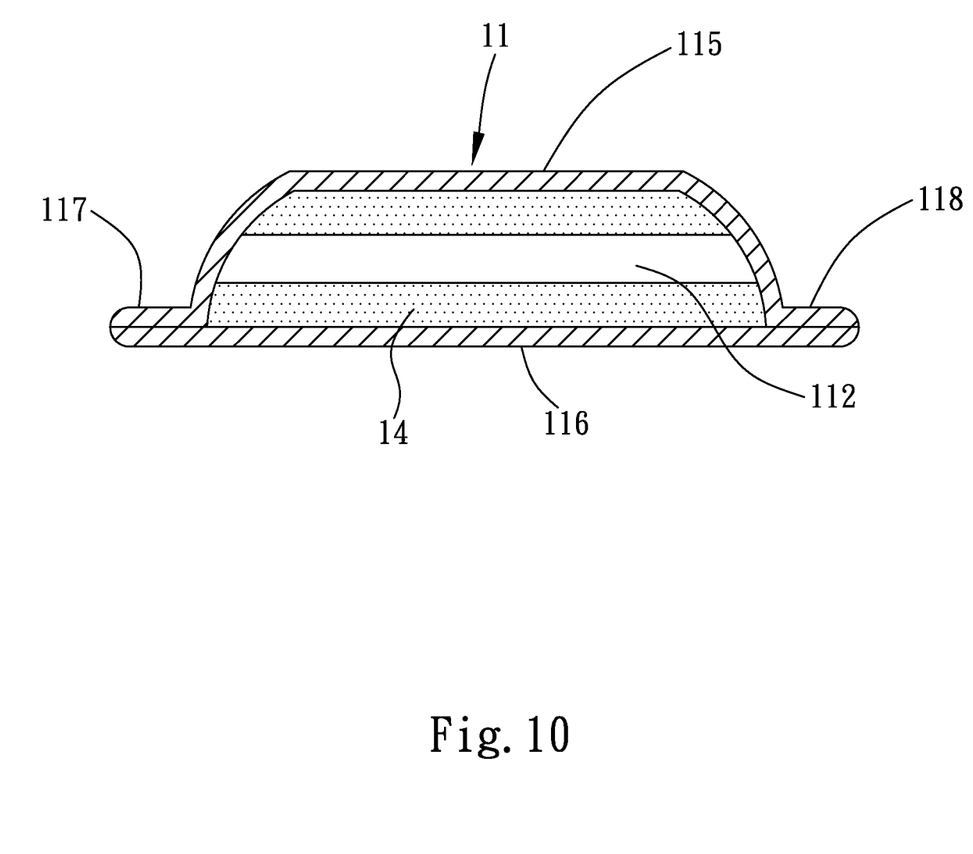
FIG. 10 is a cross-sectional view taken along a longitudinal direction of the flattened pipe according to the present invention.

In the third step (sp3), a conduit 15 is provided as shown in FIG. 8. The conduit 15 has a first end exposed to the outside of the flattened pipe 11 and a second end and partially received within in communication with the chamber 112 and is provided therein prior to sealing the first through-hole 113 and the second through-hole 114.

In the fourth step (sp4), the first through-hole 113 and the second through-hole 114 of the flattened pipe 11 are sealed to form a first sealing side 117 and a second sealing side 118 to thereby seal the chamber 112.

In the fifth step (sp5), the conduit 15 thereby is connected with the flattened pipe 11 as a result of the fourth step, whereby the conduit 15 is sandwiched between the upper plate 115 and lower plate 116.

In the sixth step (sp6), the air inside the chamber 112 is evacuated through the conduit 15. Then, a working fluid is filled in the chamber 112 via the conduit 15. Then, the first end of the conduit 15 is sealed to thereby completely seal the chamber 112

The powders used in the sintering process of the present embodiment may be metallic powders (such as copper powders) or ceramic powders. In the first step (sp1), the pipe 11 filled with the powders is put into a sintering oven. After being sintered and cooled, the pipe 11 is taken out of the sintering oven and the central rod 12 is removed from the pipe 11.

In the second step (sp2), the free end 1411 and the upper plate 115 are connected by diffusion binding. In the fourth step (sp4), the first through-hole 113 and the second through-hole 114 are sealed by diffusion binding to thereby seal the first sealing side 117 and the second sealing side 118.

The wick structure post can be made by filling copper fibers, copper meshes or copper posts into a mould and performing a sintering process. In this way, the porosity of the wick structure post can be made the same as or different from that of the wick structure layer.

In comparison with prior art, the present invention has advantages features as follows.

(1) A wick structure layer 14 and at least one wick structure post 141 are directly formed in the pipe 11, and then the pipe 11 is pressed to be flattened. As a result, the wick structure post 141 can be configured to support in the pipe 11 to prevent the flattened pipe 11 from suffering deformation and maintain its structural strength.

(2) The present inventive method involves fewer steps, so that the time for performing such a simplified method is shortened. Furthermore, the yield of products is raised with a reduced cost.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A method for manufacturing a flat plate heat pipe, including steps of: providing a pipe and a central rod, the pipe having a continuously surrounding wall unit, the wall unit defining a chamber therein, the chamber being formed with a first through-hole and a second through-hole on both ends of the pipe, the central rod being inserted into the pipe in such a manner that an outer surface of the central rod faces an inner surface of the chamber to form a filling space there between, the outer surface of the central rod being formed with a plurality of grooves in communication with the filling space, wherein the grooves are situated parallel to a longitudinal axis of the central rod and extended straight from an end to the other end of the central rod, providing filling powders in the filling space and the grooves, sintering the pipe filled with the powders and then directly drawing the central rod out along an axial direction of the pipe, thereby forming a porous wick structure layer and at least one porous wick structural post on the inner surface of the chamber, the wick structure post having a free end protruding from the wick structure layer;

pressing the pipe to become a flattened pipe, the flattened pipe having an upper plate and a lower plate with the porous wick structure, the porous wick structure post being a supporting structure between the upper plate and the lower plate;

bonding the porous wick structure post to any one of the upper plate and the lower plate by using diffusion bonding and then the porous wick structure post is bonded to the porous wick structure layer on the inner surface of the upper plate or the lower plate;

providing a conduit having a first end exposed to the outside of the pipe and a second end in communication with, and partially received within the chamber prior to sealing the first through-hole and the second through-hole;

sealing the first through-hole and the second through-hole of the flattened pipe by diffusion bonding to form a first sealing side and a second sealing side to thereby seal the chamber and connect the conduit to the flattened pipe; and evacuating air in the chamber with the conduit, filling a working fluid in the chamber through the conduit, and sealing the first end of the conduit.

2. The method for manufacturing a flat plate heat pipe according to claim 1, wherein the grooves are formed on one side of the central rod.

3. The method for manufacturing a flat plate heat pipe according to claim 1, wherein the wick structure layer is formed of the powders filled in the filling space.

4. The method for manufacturing a flat plate heat pipe according to claim 1, wherein the wick structure post is formed of the powders filled in the grooves.

5. The method for manufacturing a flat plate heat pipe according to claims 1, wherein the powders are metallic powders or ceramic powders.

6. The method for manufacturing a flat plate heat pipe according to claim 1, wherein the wick structure post is made by filling copper fibers, copper meshes or copper posts into a mould and performing a sintering process.

\* \* \* \* \*